US010481963B1

(12) United States Patent
    Walker

(10) Patent No.: US 10,481,963 B1
(45) Date of Patent: Nov. 19, 2019

(54) LOAD-BALANCING FOR ACHIEVING TRANSACTION FAULT TOLERANCE

(71) Applicant: AMAZON TECHNOLOGIES, INC., Seattle, WA (US)

(72) Inventor: David Walker, Old Basing (GB)

(73) Assignee: Amazon Technologies, Inc., Seattle, WA (US)

( * ) Notice: Subject to any disclaimer, the term of this patent is extended or adjusted under 35 U.S.C. 154(b) by 555 days.

(21) Appl. No.: 15/197,700

(22) Filed: Jun. 29, 2016

(51) Int. Cl.
*G06F 11/07* (2006.01)
*H04L 29/08* (2006.01)
*H04L 12/24* (2006.01)
*H04L 1/22* (2006.01)
*H04L 1/00* (2006.01)
*G06F 11/30* (2006.01)

(52) U.S. Cl.
CPC .............. *G06F 11/07* (2013.01); *G06F 11/30* (2013.01); *G06F 11/301* (2013.01); *G06F 11/3006* (2013.01); *H04L 1/0008* (2013.01); *H04L 1/22* (2013.01); *H04L 41/065* (2013.01); *H04L 67/1014* (2013.01); *H04L 67/1029* (2013.01); *H04L 67/1031* (2013.01); *H04L 67/1034* (2013.01); *H04L 67/16* (2013.01)

(58) Field of Classification Search
CPC .............. H04L 1/00; H04L 1/0078–008; H04L 1/0086; H04L 1/0089; H04L 1/0098; H04L 1/22; H04L 41/00; H04L 41/06; H04L 41/0631; H04L 41/0654; H04L 43/00; H04L 67/00; H04L 67/10; H04L 67/1002; H04L 67/1004; H04L 67/1014; H04L 67/1029; H04L 67/1031; H04L 67/1034; G06F 11/00; G06F 11/07; G06F 11/08; G06F 11/14; G06F 11/1479; G06F 11/1497; G06F 11/30–301
See application file for complete search history.

(56) References Cited

U.S. PATENT DOCUMENTS

| | | | | | |
|---|---|---|---|---|---|
| 4,375,683 | A | * | 3/1983 | Wensley | G06F 11/187 326/11 |
| 4,392,199 | A | * | 7/1983 | Schmitter | G06F 11/184 714/10 |
| 4,412,281 | A | * | 10/1983 | Works | G06F 11/10 714/4.5 |
| 4,570,261 | A | * | 2/1986 | Maher | G06F 11/0757 714/25 |
| 4,794,601 | A | * | 12/1988 | Kikuchi | G06F 11/10 714/758 |
| 4,868,818 | A | * | 9/1989 | Madan | G06F 11/0757 714/4.1 |
| 4,967,347 | A | * | 10/1990 | Smith | G06F 11/184 714/12 |

(Continued)

*Primary Examiner* — Michael A Keller
(74) *Attorney, Agent, or Firm* — Blank Rome LLP

(57) ABSTRACT

A system for servicing a request in a distributed computing environment includes a plurality of computing devices configurable to implement a first compute instance group. The first instance group includes a first plurality of compute instances of a provider network. One or more of the computing devices is configured to implement a first network device that is configured to receive a first service request from a client directed to an application and to provide the first service request to each of the first plurality of compute instances. The application is run on each of the first plurality of compute instances.

15 Claims, 12 Drawing Sheets

(56) References Cited

U.S. PATENT DOCUMENTS

| | | | | |
|---|---|---|---|---|
| 4,984,241 A * | 1/1991 | Truong | G06F 1/12 | 326/11 |
| 5,295,258 A * | 3/1994 | Jewett | G06F 1/12 | 714/12 |
| 5,339,404 A * | 8/1994 | Vandling, III | G06F 11/1683 | 714/1 |
| 5,598,529 A * | 1/1997 | Garay | G06F 11/182 | 714/11 |
| 5,812,565 A * | 9/1998 | Fendt | G11C 29/88 | 714/6.1 |
| 5,864,654 A * | 1/1999 | Marchant | G06F 11/183 | 714/3 |
| 5,890,003 A * | 3/1999 | Cutts, Jr. | G06F 9/52 | 710/263 |
| 5,903,717 A * | 5/1999 | Wardrop | G06F 11/1658 | 714/12 |
| 6,026,404 A * | 2/2000 | Adunuthula | G06F 9/4843 | |
| 6,044,487 A * | 3/2000 | Li | G06F 11/1435 | 714/5.1 |
| 6,477,663 B1 * | 11/2002 | Laranjeira | G06F 11/2038 | 709/201 |
| 6,490,693 B1 * | 12/2002 | Briskey | G06F 11/1425 | 714/12 |
| 6,763,520 B1 * | 7/2004 | Seeds | G06F 9/5055 | 709/224 |
| 6,799,195 B1 * | 9/2004 | Thibault | G05B 19/41835 | 700/4 |
| 6,845,505 B1 * | 1/2005 | Adunuthula | G06F 9/4843 | 718/104 |
| 6,915,344 B1 * | 7/2005 | Rowe | H04L 43/50 | 709/219 |
| 7,058,052 B2 * | 6/2006 | Westphal | H04L 12/4633 | 370/231 |
| 7,467,326 B2 * | 12/2008 | Hillman | G06F 11/1658 | 714/11 |
| 7,656,189 B1 * | 2/2010 | Trimberger | G06F 21/76 | 326/21 |
| 8,090,880 B2 * | 1/2012 | Hasha | H04L 67/1095 | 707/627 |
| 8,135,987 B2 * | 3/2012 | Douceur | G06F 11/187 | 714/11 |
| 8,612,330 B1 * | 12/2013 | Certain | G06Q 30/06 | 705/37 |
| 8,694,647 B2 * | 4/2014 | Bolosky | G06F 17/30581 | 709/227 |
| 8,745,440 B1 * | 6/2014 | Ceze | G06F 9/3851 | 714/10 |
| 8,813,233 B1 * | 8/2014 | Wilson | G06F 21/577 | 718/1 |
| 8,838,539 B1 * | 9/2014 | Ashcraft | H04L 67/02 | 707/637 |
| 8,938,495 B2 * | 1/2015 | Lee | H04L 67/42 | 709/203 |
| 8,949,658 B1 * | 2/2015 | Scanlan | G06F 11/3419 | 714/4.2 |
| 9,197,549 B2 * | 11/2015 | Kumar | H04L 45/38 | |
| 9,294,391 B1 * | 3/2016 | Mostert | H04L 61/1511 | |
| 9,553,757 B1 * | 1/2017 | Roth | H04L 67/42 | |
| 9,647,889 B1 * | 5/2017 | Jones | G06F 9/547 | |
| 9,832,606 B1 * | 11/2017 | Jones, II | H04W 4/021 | |
| 2003/0061535 A1 * | 3/2003 | Bickel | G06F 11/1658 | 714/11 |
| 2004/0062265 A1 * | 4/2004 | Poledna | G06F 11/1482 | 370/442 |
| 2004/0221149 A1 * | 11/2004 | Rao | G06F 11/1435 | 713/2 |
| 2004/0268112 A1 * | 12/2004 | Mittal | G06F 9/4405 | 713/2 |
| 2005/0278457 A1 * | 12/2005 | Hall | H04L 12/417 | 709/240 |
| 2010/0235569 A1 * | 9/2010 | Nishimoto | G06F 3/064 | 711/103 |
| 2011/0138055 A1 * | 6/2011 | Daly | G06F 9/505 | 709/226 |
| 2012/0117419 A1 * | 5/2012 | Hillman | G06F 11/073 | 714/12 |
| 2012/0239722 A1 * | 9/2012 | Bolosky | G06F 17/30581 | 709/201 |
| 2013/0232576 A1 * | 9/2013 | Karnikis | G06F 21/56 | 726/24 |
| 2014/0280375 A1 * | 9/2014 | Rawson | G06F 17/30289 | 707/803 |
| 2015/0120780 A1 * | 4/2015 | Jain | G06F 21/6227 | 707/783 |
| 2015/0195372 A1 * | 7/2015 | Zheng | H04W 4/18 | 709/217 |
| 2015/0227598 A1 * | 8/2015 | Hahn | G06F 17/3007 | 707/722 |
| 2016/0080259 A1 * | 3/2016 | Biancaniello | H04L 45/74 | 709/203 |
| 2016/0088066 A1 * | 3/2016 | Thomas | H04L 67/10 | 709/203 |
| 2016/0094622 A1 * | 3/2016 | Thomas | H04L 67/10 | 709/203 |
| 2016/0132214 A1 * | 5/2016 | Koushik | H04L 63/10 | 715/741 |
| 2016/0261712 A1 * | 9/2016 | Matte | H04L 63/102 | |
| 2018/0167453 A1 * | 6/2018 | Luo | H04L 41/5058 | |
| 2018/0198626 A1 * | 7/2018 | Kroonmaa | H04L 9/3247 | |
| 2018/0198675 A1 * | 7/2018 | Siddiqui | H04L 67/1008 | |

* cited by examiner

| State Table 402 | Destination Address 404 | Request Metadata 406 | Response Metadata 408 | Instance 126A Response 410 | Instance 126B Response 412 | Instance 126N Response 414 |
|---|---|---|---|---|---|---|
| Source Request 1 | Destination Request 1 | Request 1 Metadata | Response 1 Metadata | Identical | Identical | Identical |
| Source Request 2 | Destination Request 2 | Request 2 Metadata | Response 2 Metadata | Identical | Different | Identical |

FIG. 4

LOAD-BALANCING FOR ACHIEVING TRANSACTION FAULT TOLERANCE

BACKGROUND

Many companies and organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers have increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. In many cases, the functionality and usability of applications that run on such platforms may rely extensively on network communications with other parts of the provider network, and/or with external entities such as clients or third parties.

In network-based computing environments, multiple computers may be employed to manage incoming service requests. Load balancers may be used to distribute the service requests across the multiple computers. Distributing the service requests across the computers helps optimize resource utilization, maximize throughput, and avoid overload of any one of the computers. Typically, a load balancer receives a request from a client device, selects one of the multiple computers to service the request, and routes the request to the selected computer, which processes the request and issues a response. Load balancers generally attempt to distribute the request load evenly across all of the service computers in an effort to prevent any individual computer from being overloaded with requests. However, many customers of the network-based computing environment provider may require fault tolerant systems, such that no transactions are lost and full system state is preserved in the event of failure. Conventional load balancers do not provide fault tolerance.

BRIEF DESCRIPTION OF THE DRAWINGS

For a detailed description of various examples, reference will now be made to the accompanying drawings in which:

FIG. 4 shows an example state table that may be utilized for routing service requests and service request responses, in accordance with various embodiments;

DETAILED DESCRIPTION

Figure 1:
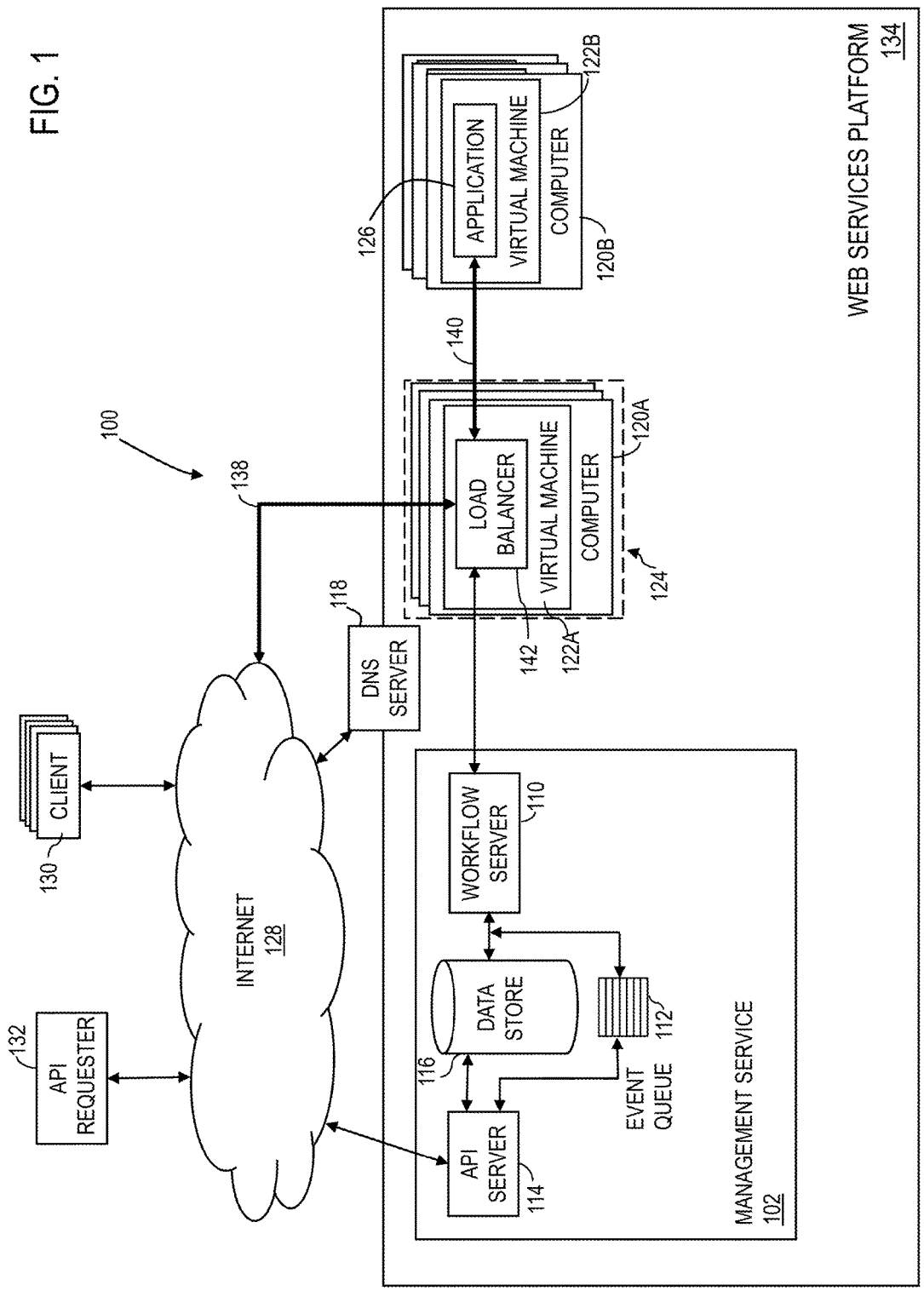
FIG. 1 shows a block diagram of a system architecture that provides control of load balancer computing resources, in accordance with various embodiments.

Conventional load balancers utilizing conventional load balancing algorithms provide high availability in the event of a single component failure in a stateless-transaction network environment. Thus, conventional load balancers, in the event of a failure, allow the system to be recovered at some point in time (the Recovery Time Objective) in a state which preserves transactions completed up until the point of failure (the Recovery Point Objective). However, conventional load balancing techniques do not provide fault tolerance (i.e., no transactions, including in-flight transactions, are lost in the event of failure and full system state is preserved). For example, in conventional load balancing systems, if a client is entering data into an internet based form presented by a service instance allocated to a load balancer, and the server fails, the client's transaction will be rerouted to another service instance in the load-balanced group. However, data entered into the form will be lost unless the internet service instances are performing synchronous storage of all data entered into a back-end database. Many customers may require fault tolerant systems, such that no transactions are lost and full system state is preserved in the event of failure (i.e. a Recovery Time Objective of zero and a Recovery Point Objective of now). Therefore, it is desirable to develop a system and method that replicates all user transaction state and data to all service instances in a load-balanced group such that no transactions are lost and full system state is preserved in the event of a failure in one of the service instances.

Various embodiments of methods and apparatus for preserving full system state in the event of a failure of a service instance in a load-balanced group are described. In some embodiments a load balancer may be applied to distribute service requests to each service instance in a load-balanced group. For example, a client may make a service request for access to an application, such as a web service, that is presented by a service instance allocated to a load balancer. Each of a plurality of service instances may run the application. The load balancer receives the service request from the client and distributes the service request to each of the service instances running the application. Each of the service instances may service and/or process the request and provide a service request response to the load balancer. Because each of the instances is in the same state and has received the same data from the load balancer, each of the service request responses should be identical. To ensure that none of the service instances have failed, the load balancer may compare the service request responses received from each of the service instances. Once a majority of the service request responses are determined to be identical, the load balancer may route a single copy of the identical service request responses to the client. If any of the service responses are not identical to (i.e., different from) any of the other service request responses, then the load balancer may determine which instance has failed and provided an incorrect service request response. Because it is assumed that most service instances will work correctly and will not fail during any given transaction, any service request response that is not identical to the majority of the service request responses may be deemed to be a faulty response. Thus, an alarm may be generated identifying which service instance routed the faulty response and, in some embodiments, the faulty service instance may be terminated (i.e., no further transactions may be routed to the faulty service instance).

Adding an additional service instance to the load-balanced group may create problems for the group because any additional service instances will not be in the same state as the other service instances and, thus, may not process service requests and/or transactions in the same manner as the other service instances. Therefore, if an additional service instance is requested for the load-balanced group, in some embodiments, a second load-balanced group may be launched. The second load-balanced group may include a load balancer and a plurality of service instances that represent the existing number of service instances from the original load-balanced group plus the number of instances desired to be added. The second load-balanced group may be connected to the same back-end infrastructure as the original load-balanced group. Any new transaction (i.e., any service request and/or transaction after the launching of the second load-balanced group) may be routed to the second load balanced group while the original load-balanced group completes any ongoing operations. Once the ongoing operations are completed within the original load-balanced group, the original load balancer and original service instances may be terminated. Thus, all new transactions are completed by the second load-balanced group. Such a system may provide a Recovery Time Objective of zero and a Recovery Point Objective of now.

As used in this document, the term "identical," when used to describe a comparison between two or more messages, requests, and/or responses (e.g., a comparison of service request responses), refers to messages, requests, and/or responses that are substantially similar (i.e., whose semantic context and/or substantive meaning is the same but whose specific content may be different). Therefore, two or more messages, requests, and/or responses may be considered to be "identical" even if the exact content of the messages, requests, and/or responses is not exactly the same as long as the meaning is the same. For example, two messages, requests, and/or responses have the same semantic context and/or substantive meaning if they have the same packet body (e.g., packet payload), if responses provide the same SYN ACK, if responses provide the same data from a data base query, if responses provide the same data from a memory query (e.g., the same word processing document), etc. Thus, in an example, a request to retrieve data may be transmitted to two virtual machine instances of a system. Because the request is being sent to two separate instances, two messages may be generated, one message being transmitted to one instance, the second message being transmitted to the second instance. The first message and the second message may have differences such as different metadata, time stamps, and header information so that the messages are routed to the correct instance. However, the two messages still have the same semantic context and/or substantive meaning because they contain the same data retrieval request. Furthermore, the two instances, in this example, may each transmit a response message in response to the data request. Again, the two response messages may have differences, such as different metadata, time stamps, and header information because the two response messages are being generated by two separate instances; however, the two response messages may have the same semantic context and/or substantive meaning because the two response messages contain the same retrieved data in response to the request. Hence, two messages, requests, and/or responses may be "identical" even if the metadata, time stamps, header information, and/or other item specific information contained in the messages, requests, and/or responses is not exactly the same so long as the semantic context and/or substantive meaning is the same between the two.

In much of the following description, a provider network is used as an example of a distributed system in which the fault tolerant load balancing techniques may be implemented. Virtual networks set up by an entity such as a company or a public sector organization to provide one or more network-accessible services (such as various types of cloud-based database, computing or storage services) accessible via the Internet and/or other networks to a distributed set of clients may be termed "provider networks" herein. At least some of the services may be packaged for client use in service units called "instances": for example, a virtual machine instantiated by a virtualized computing service may represent a "compute instance," and a storage device such as a block-level volume instantiated by a storage service may be referred to as a "storage instance." In some embodiments, instances of higher-level services may be packaged using compute instances and/or storage instances—e.g., a database instance may be built using a combination of compute and storage instances in some embodiments. Computing devices such as servers and/or storage devices at which such units of various network-accessible services of a provider network are implemented may be referred to herein as "instance hosts" or more simply as "hosts." In the remainder of this document, the term "client," when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of the provider network.

A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments. Clients may interact with resources and services at the provider network from devices located at client-owned or client-managed premises or data centers external to the provider network, and/or from devices within the provider network. In at least some embodiments, a virtualized computing service offering various types of compute instances may be implemented within the provider network, and such compute instances may be allocated to clients. Other services of the provider network may be accessed from such compute instances as well as from external locations. It is noted that although provider networks serve as one example context in which many of the load balancing techniques described herein may be implemented, those techniques may also be applied to other types of distributed systems than provider networks, e.g., to large-scale distributed application environments in which different components of the applications may have time-varying bandwidth needs.

FIG. 1 shows a schematic diagram of system architecture that provides control of load balancer computing resources in accordance with various embodiments. The system architecture 100 includes a web services platform 134 that communicates with an application programming interface (API) requestor 132 and one or more clients 130 via the Internet 128. The API requestor 132 is a management entity that provides control information to the web services platform 134, and receives status information from the web services platform 134. The API requestor 132 may be a management console presented in a web browser executed by a computer, a command line interface executed by a computer, an automated management system or script executed by a computer, etc. A customer (e.g., a business entity) of a web services provider may utilize the API requestor 132 to receive status information from the web services platform 134 and to provide control information to the web services platform 134.

The clients 130 are computing devices that request services from an application executed by the web services platform 134. A computing device suitable for use as an API requestor 132 or client 130 may be a desktop computer, a laptop computer, a tablet computer, a smartphone, or other computing device.

The domain name service (DNS) server 118 stores DNS records that may include network addresses (e.g., internet protocol (IP) addresses) of servers that correspond to domain names. The web services platform 134 includes a plurality of computers 120 (120A, 120B, etc.). The plurality of computers 120B are arranged to execute applications 126 that provide services to the clients 130. The web services platform 134 may execute multiple instances of the application 126 to provide a desired quality of service to the clients 130. In an example embodiment, the web services platform 134 executes each instance of the application 126 in a virtual machine 122B or a container (not illustrated), thus a virtual machine instance runs each instance of the application 126. Each virtual machine 122 is executed by a computer 120B. As each additional instance of the application 126 is created, the web services platform 134 allocates a computer 120B to the application, creates an instance of the virtual machine 122B on the computer 120B, and executes the instance of the application 126 on the virtual machine 122B. By varying the number of instances of application 126 executing on a virtual machine 122B, the web services platform 134 scales the computing resources dedicated to the application 126 as needed to provide a desired quality of service.

To control distribution of service requests 138 received from the clients 130 to the instances of the application 126, as requests 140, the web services platform 134 instantiates a load balancer 124. The load balancer 124 may be executed in one or more virtual machines 122A by one or more computers 120A. The load balancer 124 may distribute service request traffic to the instances of the application 126 by random selection, round robin distribution, to each instance of the application, or may implement one or more additional algorithms to distribute traffic. For example, for routing requests, the load balancer 124 may take into account factors such as an application's reported load, recent response times, number of active connections, geographic location, number of requests an application has recently been assigned, whether the system is a fault tolerant system, etc. For fault tolerant systems, the load balancer 124 may be configured to route and/or provide each service request and/or data corresponding to each service request from clients 130 to each of the instances of the application 126. Thus, each instance of the application 126 running on virtual machines 122B may service the request providing fault tolerant redundancy to the system. While load balancer 124 is shown as a single load balancer, in some embodiments, load balancer 124 may operate as a load balancer set (e.g., in some cases a pair of load balancers and in other cases more than two load balancers) with state information replicated amongst the set of load balancers synchronously.

The web services platform 134 includes a management service 102 that controls operation of and allocation of computing resources to the load balancer 124. The management service 102 includes an API server 114, a data store 116, an event queue 112, and a workflow server 110. The API server 114 receives requests from the API requester 132 and configures the management service 102 to execute the requests. For example, the API server 144 may receive a request to create a load balancer 124, modify the load balancer 124, configure the load balancer 124, etc. On receipt of a request from the API requestor 132, the API server 114 may store parameters received as part of the request in the data store 116. The data store 116 provides persistent storage for parameters of the load balancer 124 and can be implemented using a database or database service or a block or object store. Parameters received as part of a request may include parameters for configuring the load balancer 124, a request identifier, an identifier for the customer and parameters specific for the load balancer 124. For example, the parameters may include values related to controlling the amount of computing resources to allocate to the load balancer 124 and which algorithm the load balancer 124 is to execute (e.g., parameters that request that the load balancer 124 operate in a fault tolerant mode). The API server 114 may also store an event flag in the event queue 112 to indicate that an operation is to be performed with respect to the load balancer 124. The event queue 112 stores flags that trigger the workflow server 110 to perform an operation.

The workflow server 110 manages the load balancer 124 based on the information stored in the data store 116. For example, the workflow server 110 may create a virtual machine 122A and an instance of the load balancer 124 as needed to route requests received from the clients 130, modify existing instances of the load balancer 124, etc. based on the information stored in the data store 116. In a specific example, this can include configuring the workflow server 110 with executable code that causes it to access the data store 116 and/or the event queue 112 to check for new requests. The workflow server 110 monitors the event queue 112 for flags indicating that an operation affecting the load balancer 124 is to be performed. If the workflow server 110 reads an event flag from the event queue 112, the workflow server 110 may perform operations to configure the load balancer 124 as indicated by the parameters stored in the data store 116. For example, in response to reading an event flag from the event queue 112, the workflow server 110 may assign an amount of computing resources for use by the load balancer 124 by creating a virtual machine 122A and executing a load balancer node 142 on the virtual machine 122A.

Figure 12:
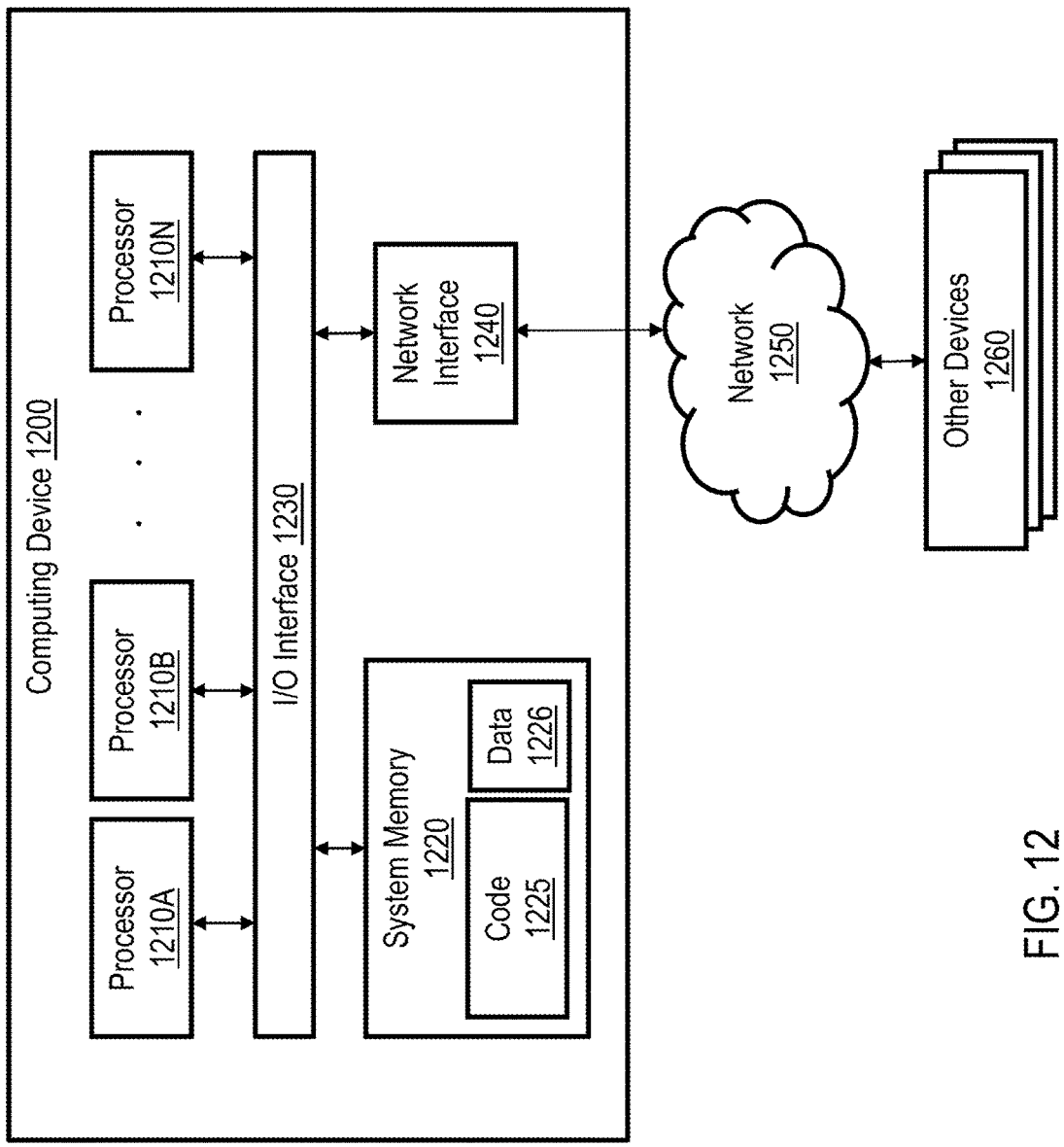
FIG. 12 shows a block diagram illustrating an example computing device, in accordance with various embodiments.

Each load balancer can be assigned an internal identifier and/or a customer identifier (identifying the customer associated with the load balancer) that are associated with the metrics for the load balancer, etc. The computing resources utilized by the load balancer 124 include processor capacity, memory, secondary storage, and network bandwidth. The computing resources are allocated to the load balancer 124 via the computer 120A. An example of a computer and the types of computing resources applied to implement the load balancer 124 are shown in FIG. 12, which is discussed below.

Figure 2:
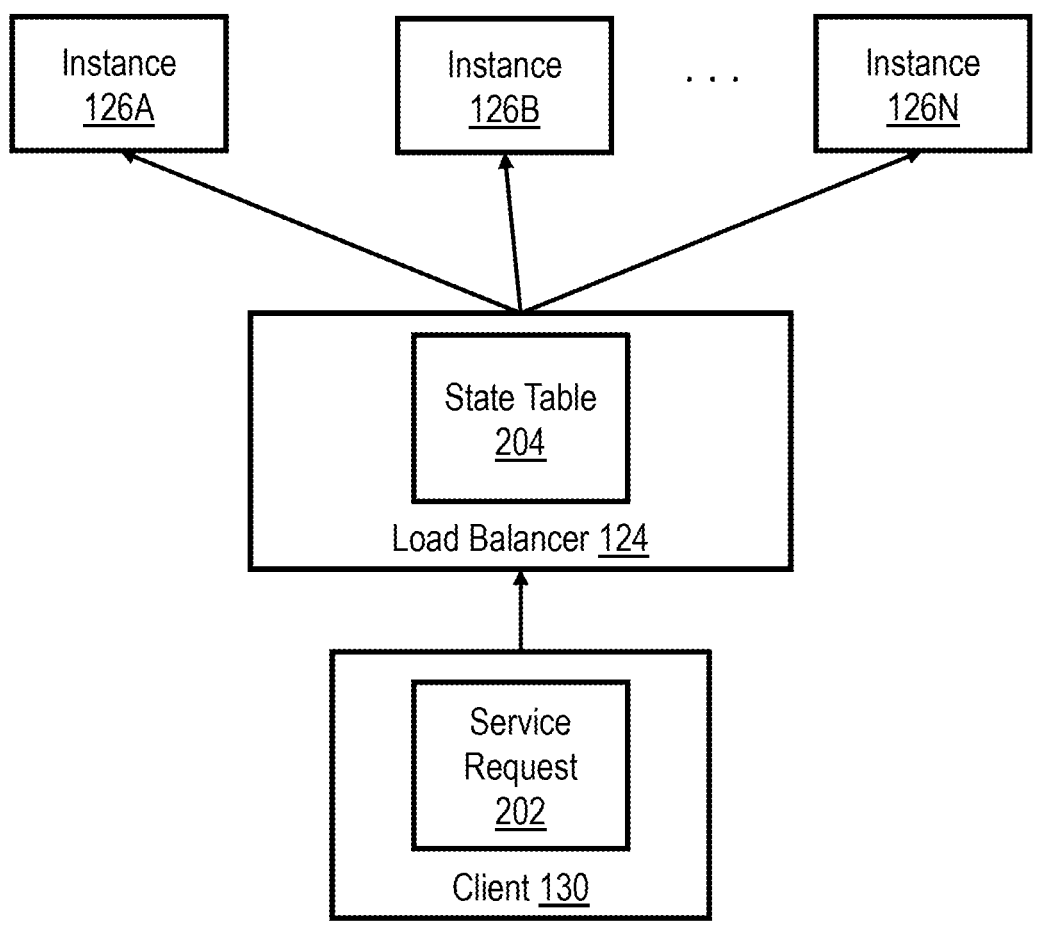
FIG. 2 shows a block diagram of an example interaction between a client, a load balancer, and various virtual machine instances for routing service requests, in accordance with various embodiments.

FIG. 2 shows a block diagram of an example interaction between a client 130, load balancer 124, and various instances 126A-N of application 126 for routing service requests, in accordance with various embodiments. Client 130 may generate a service request 202 for processing by application 126. For example, client 130 may generate a request that requests access to a web page being run by application 126. As discussed above, the service request 202 is routed, in some cases as packets of data, to load balancer 124. Service request 202 may be encrypted, in some cases with a unidirectional trust using a certificate/key pair accessible to load balancer 124. Therefore, load balancer 124 may decrypt the service request 202.

Information pertaining to service request 202 may be logged in state table 204 which may be stored in load balancer 124. In alternative embodiments, state table 204 may be stored in other computing systems and/or virtual machines that have access to load balancer 124. For example, the state table 204 may be stored in another data store in a data plane of the web services platform 134. As a service request 202 is received from client 130, the information pertaining to the service request may be provided to workflow server 110 and stored in data store 116. Information pertaining to service request 202 that may be logged in state table 204 may include metadata that includes source and destination address and port details, any cookies, time of receipt, etc.

In embodiments in which load balancer 124 operates as a load balancer set, the service request 202 may be routed to a virtual IP address and port of one of the load balancer set. That load balancer may log the information pertaining to the service request 202 in a state table and synchronously replicate the information to the remaining load balancers in the set where the information may also be stored in a state table.

The service request 202 then may be routed to each of instances 126A-N. More particularly, the packet body (i.e., payload) of the service request 202 (i.e., the service request 202 received from the client 130 without header information) may be routed and/or provided to each of instances 126A-N for servicing. Thus, each of instances 126A-N receives an identical copy of the service request 202. In some embodiments, the load balancer 124 may include additional information with the service request being routed to instances 126A-N including a source address that indicates that load balancer 124 is the source of the service request and further metadata, such as load balancer 124 inserted cookies. Hence, the service request 202 may add information that indicates that the service request is initiated by the load balancer 124. Furthermore, the load balancer 124 may encrypt the packets that constitute the service request, in some embodiments, with unidirectional trust using a certificate/key pair accessible to load balancer 124 and instances 126A-N. After each of the instances 126A-N receive an identical service request, each of the instances 126A-N are configured to service and/or process the service request and return a response to load balancer 124.

Figure 3:
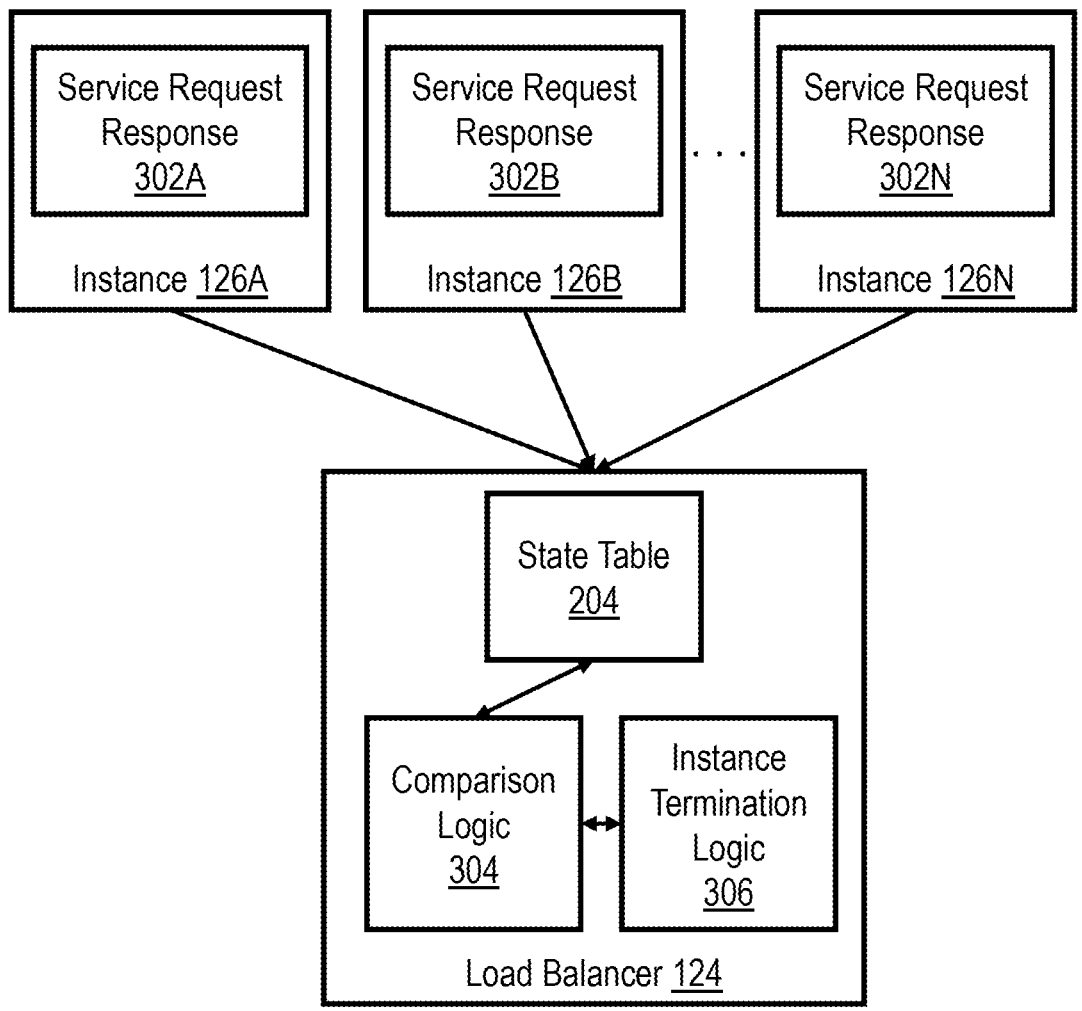
FIG. 3 shows a block diagram of an example interaction between various virtual machine instances and a load balancer for routing service request responses, in accordance with various embodiments.

FIG. 3 shows a block diagram of an example interaction between the virtual machine instances 126A-N and load balancer 124 for routing service request responses 302A-N, in accordance with various embodiments. As stated above, after each of the instances 126A-N service and/or process the service request, each instance 126A-N generates a service request response 302A-N and routes and/or provides the service request response to the load balancer 124. For example, after receiving service request 202 from client 130, instance 126A processes the service request and generates a service request response 302A. Service request response 302A is then routed and/or provided to load balancer 124. Similarly, after receiving the identical service request 202 from client 130 as instance 126A, instance 126B processes the service request and generates a service request response 302B which is routed and/or provided to load balancer 124. The service request responses 302A-N may be any type of response to the service request 202. For example, the service request responses may be a SYN ACK or a whole set of packets resulting from a database query service request.

Each of the service request responses 302A-N are received by the load balancer 124 and logged in state table 204. In some embodiments, multiple packets comprise the service request responses 302A-N (i.e., for transactions that are associated with some types of services). In these embodiments, the packets of a service request response 302A-N may be transmitted from the instances 126A-N to the load balancer 124 utilizing the Transmission Control Protocol (TCP). Thus, the packets may be received out-of-order. Hence, in some embodiments, load balancer 124 includes a buffer to allow the multiple packets to be received and placed into their proper order.

Comparison logic 304 is configured to compare the service request responses 302A-N that are logged in the state table 204 to determine whether the responses from each of the instances 126A-N are identical to one another (i.e., whether the packet body of each of the service request responses 302A-N are identical to one another). Because the instances 126A-N receive identical service requests (e.g., service request 202), the service request responses 302A-N should be identical. In some embodiments, comparison logic 304 performs a digest operation on and/or checksums the service request responses 302A-N as logged in state table 204 to determine whether the responses are identical. The comparison logic 304 may determine that one or more of the service request responses 302A-N are not identical to the remainder of the service request responses (i.e., one or more of the service request responses are different from other service request responses). The comparison logic 304 then may determine whether a majority of the service request responses 302A-N are identical. For example, if there are nine instances 126A-N running application 126, then the comparison logic 304 may determine whether five or more of the service request responses 302A-N are identical because it is assumed that a majority of the instances 126A-N, when operating correctly, will generate identical service request responses. In other words, it is assumed that an instance 126A-N will produce a non-identical and/or different service request response 302A-N if it failed and/or malfunctioned, but not if it is operating correctly.

Instance termination logic 306 is configured to generate an alarm identifying from which of the instances 126A-N the service request responses that are different from the majority of service request responses. In other words, instance termination logic 306 is configured to generate an alarm identifying the instance that generates and routes the non-identical service request response to the load balancer 124. In some embodiments, the alarm that is generated by instance termination logic 306 is a communication that is transmitted by load balancer 124 to the workflow server 110 and/or an internal alarm that identifies to the load balancer 124 which instances 126A-N are producing different service request responses 302A-N than the majority of the other instances. For example, instance termination logic 306 may mark the instances 126A-N which generate a different service request response than the majority of the other instances in an instance health check table in the load balancer 124 as having a bad transaction health check. In some embodiments, instance termination logic 306 may terminate any of the instances 126A-N which generates a different service request response than the majority of the other instances. More particularly, the instance termination logic 306 may cause the load balancer 124 to route any further service requests to all instances other than the terminated instance. In some embodiments, instance termination logic 306 may not terminate an instance 126A-N which generates a different service request response than the majority of the other instances unless the same instance generates a different service request response than the majority of the other instances a threshold number of times and/or a threshold number of times in a row.

In an example, instances 126A-N may all generate a service request response 302A-N in response to receiving and processing service request 202. These service request responses 302A-N are routed to the load balancer 124. Comparison logic 304 compares each of the service request responses 302A-N to determine whether there are any non-identical service request responses. If service request response 302B generated and routed to load balancer 124 by instance 126B is different from a majority of the other service request responses (i.e., 126A, 126N), then an alarm is generated identifying instance 126B as generating the non-identical service request response. Furthermore, instance 126B may be terminated. Thus, in the event that a subsequent service request is received by load balancer 124, that service request is routed to all of the instances 126A-N except for instance 126B.

FIG. 4 shows an example state table 204 that may be utilized for routing service requests 202 and service request responses 302A-N, in accordance with various embodiments. The state table 204, which may be stored in load balancer 124, may include state information from service requests, such as service request 202, and service request responses, such as service request responses 126A-N. For example, the state table may include the request source address from a service request in column 402, the destination address for a service request in column 404, service request metadata in column 406, service request response metadata in column 408, and service request responses 302A-N in columns 410-414. In the example state table 204 shown in FIG. 4, two service requests have been received from client 130 (i.e., service requests 1 and 2). Once received by load balancer 124, each of the service request's source address (the address of client 130) is logged in column 402. Additionally, the destination address for the two service requests are logged in column 404 and metadata is logged in column 406. The load balancer then routes the service requests, at the time they are received, to each of the instances 126A-N.

Once instances 126A-N receive service request 1, the instances 126A-N process the request and generate service request responses 302A-N. The service request responses 302A-N are routed to the load balancer 124. Metadata from the responses are logged in column 408 while the service request responses 302A-N (i.e., the packet body of the transmissions received from the instances 126A-N) are logged in columns 410-414. In this example, as shown in columns 410, 412, and 414, each of the service request responses 302A-N are identical. Similarly, once instances 126A-N receive service request 2, the instances 126A-N process the request and generate service request responses 302A-N. The service request responses 302A-N are routed to the load balancer 124. Metadata from the responses are logged in column 408 while the service request responses 302A-N (i.e., the packet body of the transmissions received from the instances 126A-N) are logged in columns 410-414. In this example, while the service request responses 302A received from instance 126A and service request response 302N received from instance 126N are identical to one another (as shown in columns 410 and 414), service request response 302B received from instance 126B is different (i.e., not identical) to the service request responses received from instance 126A and 126N (as shown in column 412). Thus, an alarm may be generated identifying instance 126B as generating a non-identical service request response, and instance 126B may be terminated.

Figure 5:
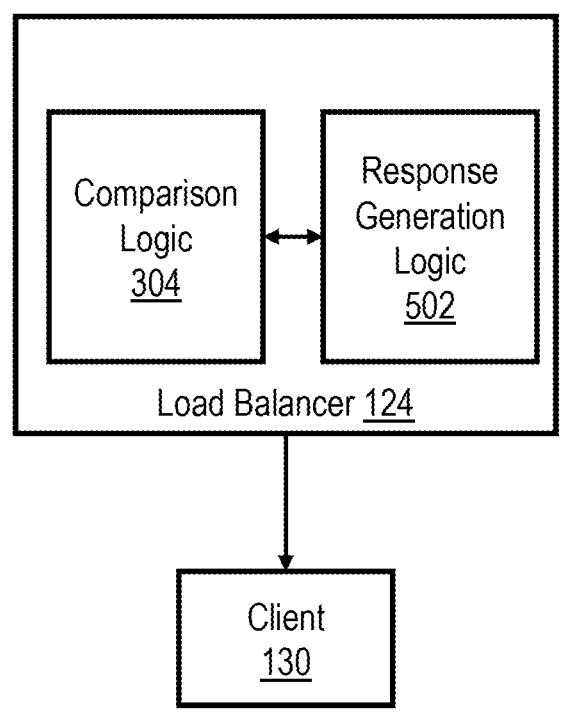
FIG. 5 shows a block diagram of an example interaction between a load balancer and a client for routing a service request response, in accordance with various embodiments.

FIG. 5 shows a block diagram of an example interaction between load balancer 124 and a client 130 for routing a service request response, in accordance with various embodiments. As discussed above, comparison logic 304 may determine whether a majority of the service request responses 302A-N are identical. For example, if there are nine instances 126A-N running application 126, then the comparison logic 304 may determine whether five or more of the service request responses 302A-N are identical because it is assumed that a majority of the instances 126A-N, when operating correctly, will generate identical service request responses. Response generation logic 502 may generate one copy of the identical packets that make up the service request responses. This copy is routed and/or provided to client 130. In other words, in response to a majority of the service request responses being identical, one copy of the identical service request responses is provided to the client 130. Continuing the previous example, once five of the service request responses 302A-N are deemed to be identical by comparison logic 304, response generation logic 502 generates a single copy of the identical service request responses and routes and/or provides that single copy of the identical service request responses to client 130.

Figure 6:
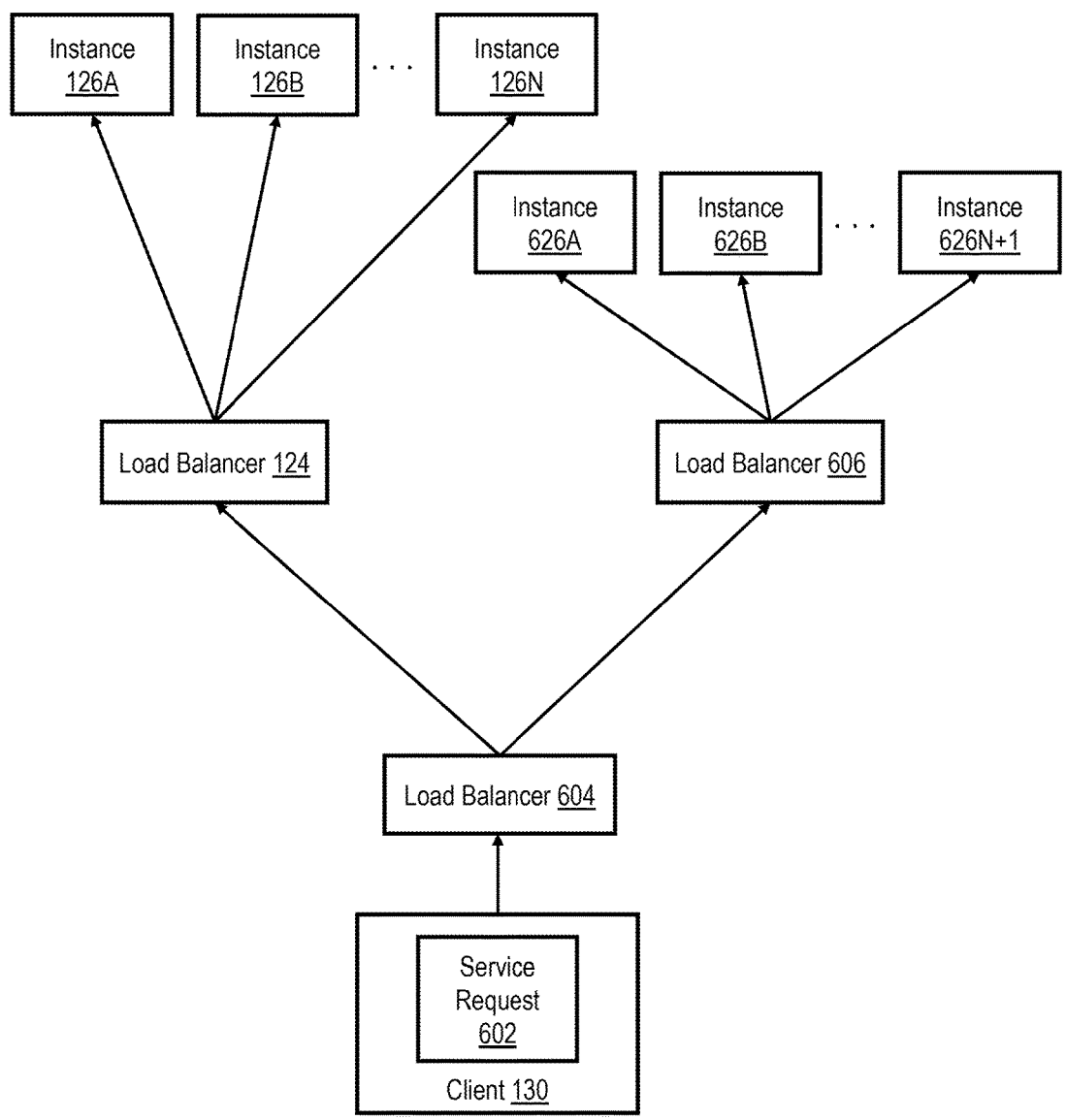
FIG. 6 shows a block diagram of an example interaction between a client, various load balancers, and various virtual machine instances for routing service requests and service request responses, in accordance with various embodiments.

FIG. 6 shows a block diagram of an example interaction between a client 130, various load balancers 124, 604-606, and various virtual machine instances 126A-N and 626A-N+1 for routing service requests 602 and service request responses, in accordance with various embodiments. If API requester 132 requests to launch a new instance and/or if one of instances 126A-N is terminated and a new instance is needed to provide adequate fault tolerance, load balancer 606 may be implemented along with instances 626A-N+1. Like load balancer 124, load balancer 606 may be executed in one or more virtual machines 122A by one or more computers 120A. The load balancer 606 may distribute service request traffic to the instances of the application 126 (i.e., instances 626A-N+1) by providing each service request to each instance of the application. While load balancer 606 is shown as a single load balancer, in some embodiments, load balancer 606 may operate as a load balancer set with state information replicated amongst the load balancers of the set synchronously. Additionally load balancer 604 may also be implemented. Like load balancers 124 and 606, load balancer 604 may be executed in one or more virtual machines 122A by one or more computers 120A. The load balancer 604 may distribute service request traffic to the load balancers 124 and 606. More particularly, load balancer 604 may distribute new service requests after the implementation of load balancer 606 to load balancer 604 while distributing any continuing transactions associated with previous service requests to load balancer 124. While load balancer 604 is shown as a single load balancer, in some embodiments, load balancer 604 may operate as a load balancer set with state information replicated amongst the load balancers of the set synchronously.

More particularly, allocating an additional instance to load balancer 124 is difficult because the amount of state and data that is needed to be replicated between the instances 126A-N and the new instance so that the new instance will process requests in the exact same manner as the old instances is unknown. If the new instance does not process service requests in the exact same manner as the old instances (due to being in different states), then the new instance may not provide the fault tolerance required. Thus, load balancer 606 as well as instances 626A-N+1 (one instance more than the number of instances allocated to load balancer 124) are implemented. In other words, a complete clone of the load balancer 124 and instance 126A-N environment is launched with the desired number of instances representing the existing number of instances plus the instances that are desired to be added, connected to the same back-end infrastructure as load balancer 124. Additionally, load balancer 604, which may be implemented at any time, is configured to route new transactions, such as service request 604 to the new clone environment (i.e., load balancer 606), continuing to do so until all operations on the original environment (i.e., load balancer 124 and instances 126A-N) have been completed. Once the last operation is completed within the environment consisting of load balancer 124 and instances 126A-N, load balancer 604 may terminate load balancer 124 and instances 126A-N and no new service requests and/or transactions are routed to load balancer 124 and/or instances 126A-N. Instead, all service requests and/or transactions are routed to load balancer 606. In some embodiments, instead of utilizing load balancer 604 to route traffic to load balancers 124 and 606, a smart DNS server (i.e., a DNS server with health checking and traffic steering capabilities) may be utilized to route traffic to load balancers 124 and 606.

Load balancer 606 may operate in a similar manner to load balancer 124. More specifically, load balancer 606 may receive service request 602 from load balancer 604. Load balancer 606 may route and/or provide the service request 602 (i.e., the packet body of the transmission containing service request 602) to each of the instances 626A-N+1. Each of the instances 626A-N+1 may process the service request and route a service request response to the load balancer 606. Load balancer 606 may compare each of the service request responses received from each of the instances 626A-N+1 with each other to determine whether all of the service request responses are identical or if any are different. In response to a majority of the service request responses received from the instances 626A-N+1 being identical, the load balancer 606 may route a copy of one of the identical service request responses to load balancer 604 and/or to client 130. If any of the service request responses received from the instances 626A-N+1 are different from a majority of the other service request responses, an alarm may be generated by load balancer 606 identifying the instance from which the different service request response was received. Load balancer 606 also may terminate the instance from which the different service request response was received (i.e., stop routing further service requests and/or transactions to the terminated instance).

Figure 7:
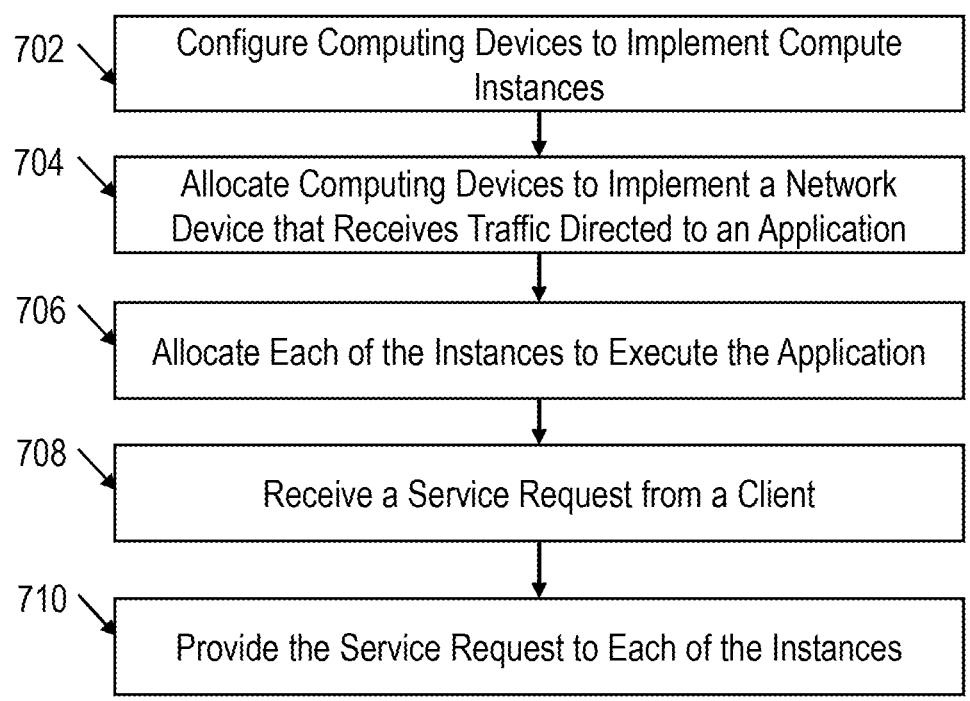
FIG. 7 shows a flow diagram illustrating aspects of operations that may be performed to service a request from a client, in accordance with various embodiments.

FIG. 7 shows a flow diagram illustrating aspects of operations that may be performed to service a request from a client, in accordance with various embodiments. Though depicted sequentially as a matter of convenience, at least some of the actions shown can be performed in a different order and/or performed in parallel. Additionally, some embodiments may perform only some of the actions shown. As shown in element 702, computing devices are configured to implement a plurality of compute instances. For example, computer 120B may be configured to implement one or more virtual machines 122B to run a plurality of instances, such as instances 126A-N, of application 126. In element 704, computing devices are allocated to implement a network device that receives traffic directed to an application. For example, computer 120A may be allocated to implement load balancer 124. Load balancer 124 may be configured to receive traffic, such as service request 202, from a client, such as client 130, which is directed to application 126. In some embodiments, the service request 202 may be encrypted with unidirectional trust using a certificate/key pair accessible to load balancer 124.

In element 706, each of the instances is allocated to execute the application. For example, instances 126A-N are allocated such that each of the instances 126A-N runs application 126. In element 708, a service request is received from a client. For example, service request 202 may be received by load balancer 124 from client 130. In element 710, the service request is provided to each of the instances. For example, the load balancer 124 may log information pertaining to the service request 202 in state table 204 which may be stored in load balancer 124. The service request 202 then may be routed to each of instances 126A-N. More particularly, the packet body of the service request 202 (i.e., the service request 202 received from the client 130 without header information) may be routed and/or provided to each of instances 126A-N for servicing. Thus, each of instances 126A-N receives an identical copy of the service request 202. In some embodiments, the load balancer 124 may include additional information with the service request being routed to instances 126A-N including a source address that indicates that load balancer 124 is the source of the service request and further metadata such as load balancer 124 inserted cookies. Hence, the service request 202 may include information that indicates that the service request is initiated by the load balancer 124. Furthermore, the load balancer 124 may encrypt the packets that constitute the service request, in some embodiments, with unidirectional trust using a certificate/key pair accessible to load balancer 124 and instances 126A-N.

Figure 8:
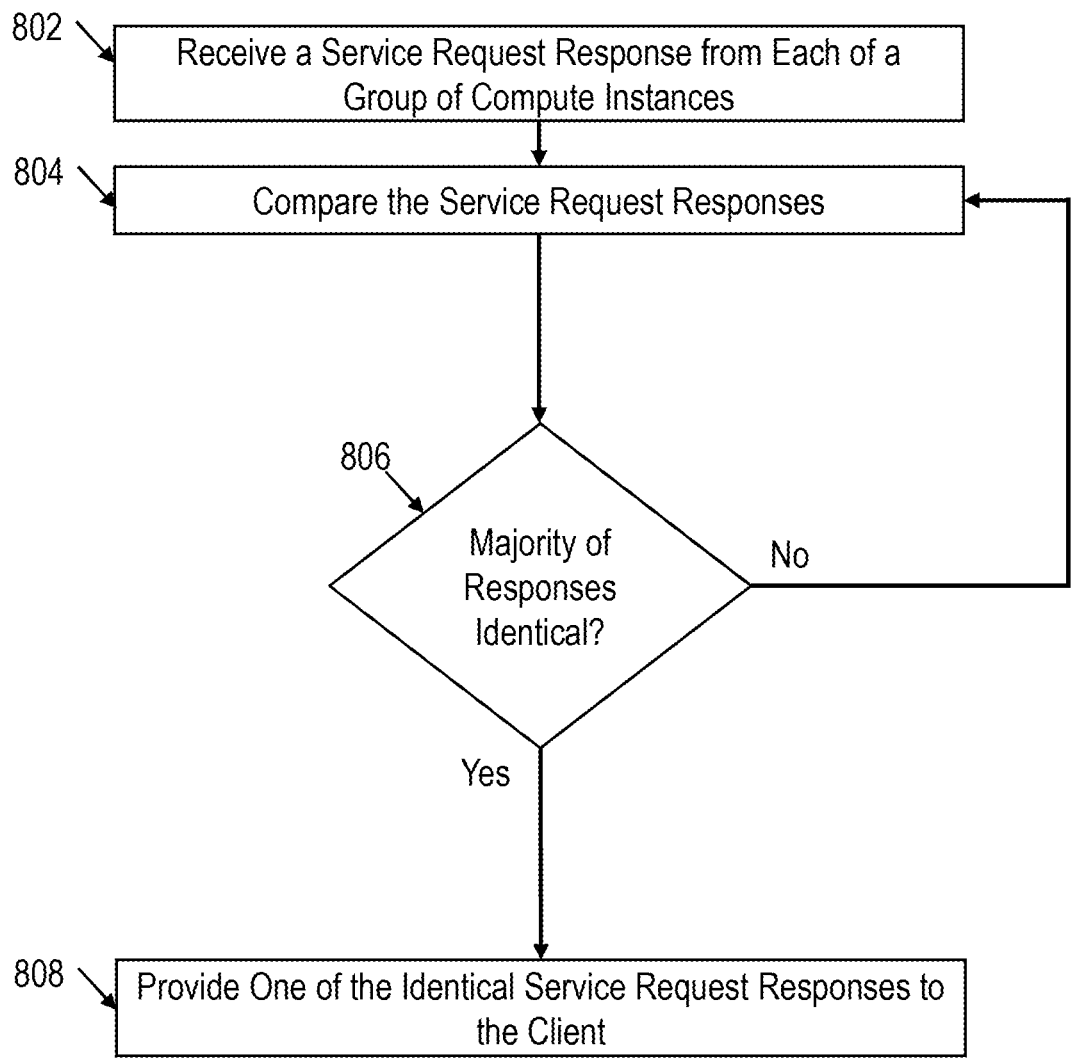
FIG. 8 shows a flow diagram illustrating aspects of operations that may be performed to respond to a service request from a client, in accordance with various embodiments.

FIG. 8 shows a flow diagram illustrating aspects of operations that may be performed to respond to a service request from a client, in accordance with various embodiments. Though depicted sequentially as a matter of convenience, at least some of the actions shown can be performed in a different order and/or performed in parallel. Additionally, some embodiments may perform only some of the actions shown. As shown in element 802, a service request response is received from each of a group of compute instances. For example, after receiving the service request 202 from load balancer 124, each of instances 126A-N may service and/or process the service request and generate a service request response, such as service request response 302A-N. More particularly, instance 126A may receive service request 202, process service request 202, and generate service request response 302A. Similarly, instance 126B may receive service request 202, process service request 202, and generate service request response 302B. The remainder of instances 126A-N may act similarly. Load balancer 124 then may receive each of the service request responses 302A-N generated by the instances 126A-N.

In element 804, the service request responses are compared. For example, load balancer 124 may compare each of the service request responses 302A-N to determine which service request responses are identical and which service request responses have differences with the other service request responses. In element 806, a determination is made as to whether a majority of the service request responses are identical. For example, load balancer 124 may determine whether a majority of the service request responses 302A-N are identical. Thus, if there are nine instances 126A-N running application 126, then the load balancer 124 may determine whether five or more of the service request responses 302A-N are identical because it is assumed that a majority of the instances 126A-N, when operating correctly, will generate identical service request responses.

If, in element 806, a determination is made that a majority of the service request responses are not identical, then the method continues in element 804 with continuing to compare the service request responses. However, if in element 806, a determination is made that a majority of the service request responses are identical, then the method continues in element 808 with providing one of the identical service request responses to the client. For example, load balancer 124 may generate one copy of the identical packets that make up each of the service request responses (i.e., the packet body of the service request responses). Those packets then may be routed and/or provided to client 130. In other words, in response to a majority of the service request responses being identical, one copy of the identical service request responses is provided to the client 130. Thus, continuing the previous example, once five of the service request responses 302A-N are deemed to be identical by load balancer 124, a single copy of the identical service request responses is generated and routed and/or provided to client 130.

Figure 9:
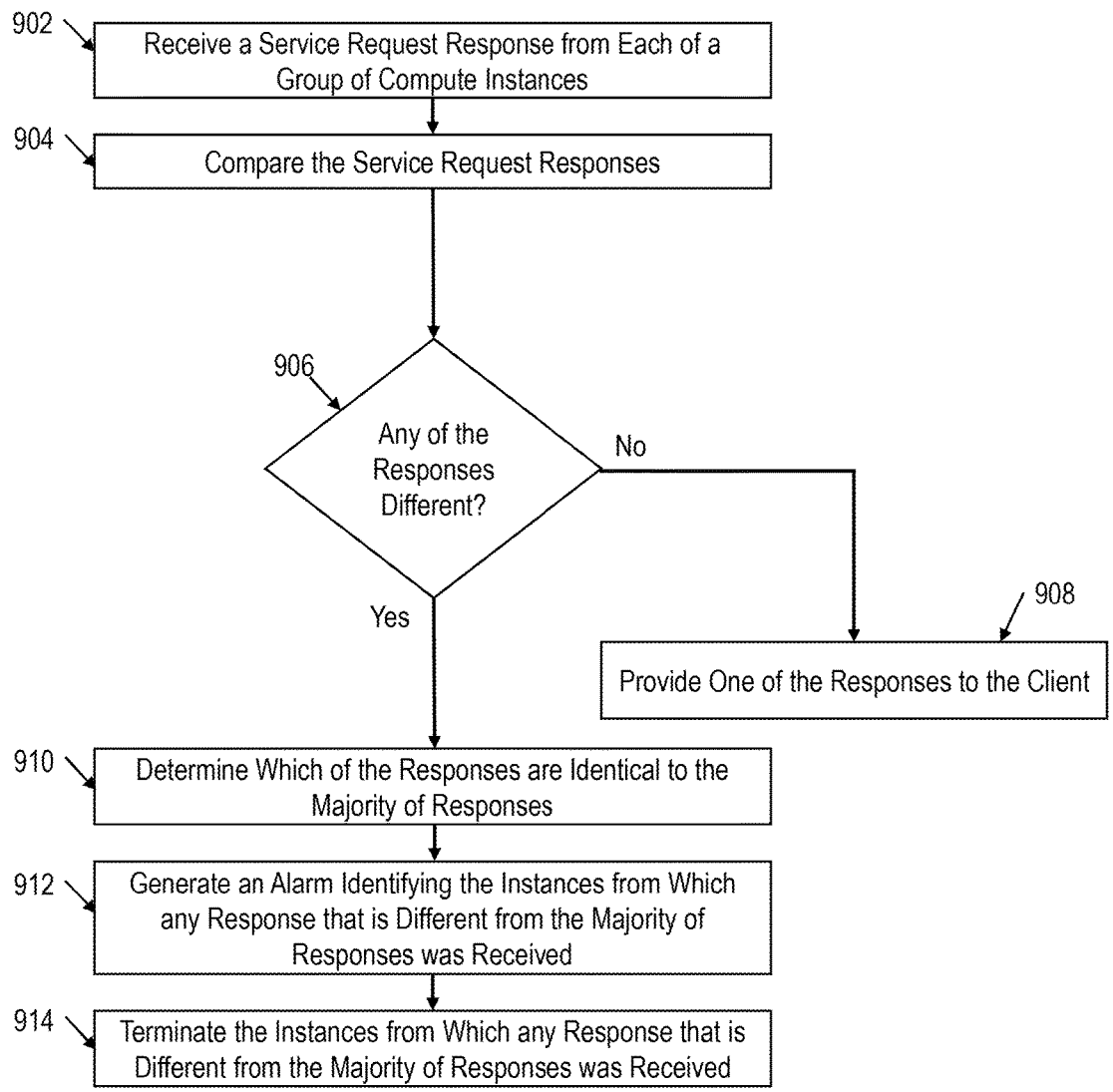
FIG. 9 shows a flow diagram illustrating aspects of operations that may be performed to respond to a service request from a client, in accordance with various embodiments.

FIG. 9 shows a flow diagram illustrating aspects of operations that may be performed to respond to a service request from a client, in accordance with various embodiments. Though depicted sequentially as a matter of convenience, at least some of the actions shown can be performed in a different order and/or performed in parallel. Additionally, some embodiments may perform only some of the actions shown. As shown in element 902, a service request response is received from each of a group of compute instances. For example, after receiving the service request 202 from load balancer 124, each of instances 126A-N may service and/or process the service request and generate a service request response, such as service request response 302A-N. More particularly, instance 126A may receive service request 202, process service request 202, and generate service request response 302A. Similarly, instance 126B may receive service request 202, process service request 202, and generate service request response 302B. The remainder of instances 126A-N may act similarly. Load balancer 124 then may receive each of the service request responses 302A-N generated by the instances 126A-N.

In element 904, the service request responses are compared. For example, load balancer 124 may compare each of the service request responses 302A-N to determine which service request responses are identical and which service request responses have differences with the other service request responses. In element 906, a determination is made as to whether any of the service request responses are different from any of the other service request responses. For example, load balancer 124 may determine whether all of the service request responses 302A-N are identical or whether any of the service request responses 302A-N are different from any other of the service request responses 302A-N. If, in element 906, a determination is made that none of the service request responses are different from any of the other service request responses, the method continues in element 908 with providing one of the responses to the client. In other words, if a determination is made that all of the service request responses are identical, the method continues in element 908 with providing one of the identical responses to the client. For example, load balancer 124 may generate one copy of the identical packets that make up each of the service request responses (i.e., the packet body of the service request responses). Those packets then may be routed and/or provided to client 130.

However, if, in element 906, a determination is made that at least one of the service request responses is different from any of the other service request responses, the method continues in element 910 with determining which of the service request responses is identical to the majority of service request responses. For example, load balancer 124 may determine service request responses 302A and 302N are identical while service request response 302B is different. Thus, load balancer 124 will determine that service request response 302B is different from the majority of service request responses. In element 912, an alarm identifying the instances from which any service request response that is different from the majority of responses was received is generated. Continuing the previous example, because service request response 302B has been identified as being different from the majority of service request responses, an alarm is generated by load balancer 124 identifying instance 126B (the instance from which service request response 302B was received). In some embodiments, the alarm that is generated by load balancer 124 is a communication that is transmitted by load balancer 124 to the workflow server 110 identifying which instances 126A-N are producing different service request responses 302A-N than the majority of the other instances. In alternative embodiments, an internal alarm to load balancer 124 is generated that identifies which instances 126A-N are producing different service request responses 302A-N than the majority of the other instances. For example, load balancer 124 may mark the instances 126A-N which generate a different service request response than the majority of the other instances in an instance health check table in the load balancer 124 as having a bad transaction health check.

In element 914, the instances from which any service request response that is different from the majority of service request responses was received are terminated. For example, load balancer 124 may terminate any of the instances 126A-N which generates a different service request response than the majority of the other instances. More particularly, the load balancer 124 may route any further service requests to all instances other than the terminated instance. Continuing the previous example, because instance 126B has generated and routed a service request response 302B that is different from the majority of other service request responses, load balancer 124 may not route any further service requests and/or transactions to instance 126B. In some embodiments, load balancer may not terminate an instance 126A-N which generates a different service request response than the majority of the other instances unless the same instance generates a different service request response than the majority of the other instances a threshold number of times and/or a threshold number of times in a row.

Figure 10:
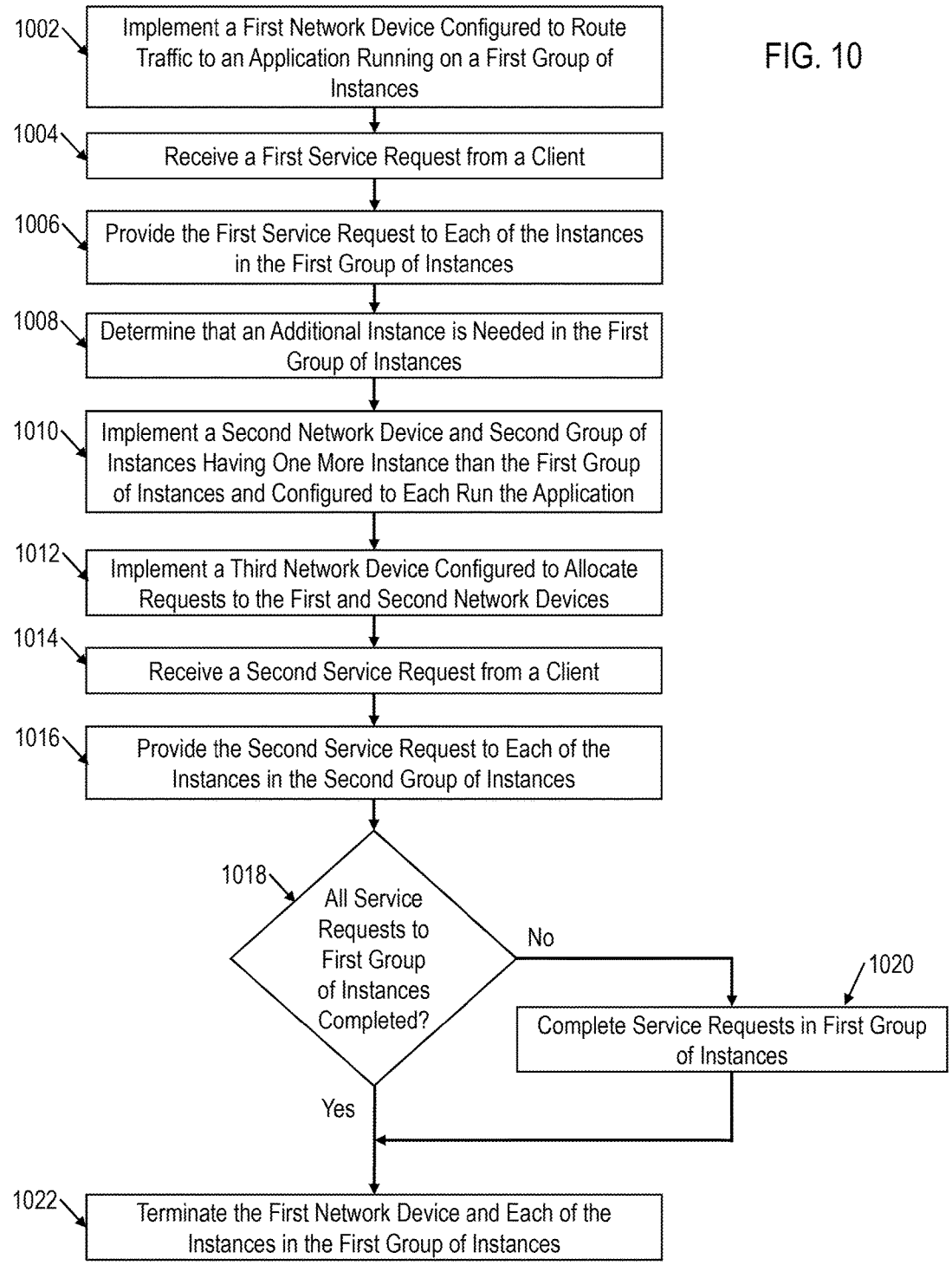
FIG. 10 shows a flow diagram illustrating aspects of operations that may be performed to respond to various service requests from a client, in accordance with various embodiments.

FIG. 10 shows a flow diagram illustrating aspects of operations that may be performed to respond to various service requests from a client, in accordance with various embodiments. Though depicted sequentially as a matter of convenience, at least some of the actions shown can be performed in a different order and/or performed in parallel. Additionally, some embodiments may perform only some of the actions shown. As shown in element 1002, a first network device configured to route traffic to an application running on a first group of instances is implemented. For example, computer 120A may be allocated to implement load balancer 124. Load balancer 124 may be configured to receive traffic, such as service request 202, from a client, such as client 130, which is directed to application 126. Additionally, computer 120B may be configured to implement one or more virtual machines 122B to run a plurality of instances, such as instances 126A-N, of the application 126.

In element 1004, a first service request is received from a client. For example, service request 202 may be received by load balancer 124 from client 130. In element 1006, the first service request is provided to each of the instances. For example, the load balancer 124 may log information pertaining to the service request 202 in state table 204 which may be stored in load balancer 124. The service request 202 then may be routed to each of instances 126A-N. More particularly, the packet body of the service request 202 (i.e., the service request 202 received from the client 130 without header information) may be routed and/or provided to each of instances 126A-N for servicing. Thus, each of instances 126A-N receives an identical copy of the service request 202. In some embodiments, the load balancer 124 may include additional information with the service request being routed to instances 126A-N including a source address that indicates that load balancer 124 is the source of the service request and further metadata such as load balancer 124 inserted cookies. Hence, the service request 202 may include information that indicates that the service request is initiated by the load balancer 124.

In element 1008, a determination is made that an additional instance is needed in the first group of instances. For example, API requester 132 may request to launch a new instance, and/or if one of instances 126A-N is terminated, a new instance may be needed to provide adequate fault tolerance for the running of application 126. In element 1010, a second network device and a second group of instances may be implemented. The second group of instances may include one more instance than the first group of instances (e.g., the second group of instances may have ten instances if the first group of instances has nine instances). Additionally, each of the instances in the second group of instances may be configured to run the application. For example, a computer may be allocated to implement load balancer 606. Additionally, a computer may be configured to implement one or more virtual machines to run instances 626A-N+1 of the application 126. In element 1012, a third network device configured to allocate requests to the first and second network devices may be implemented. For example, a computer may be allocated to implement load balancer 604 which is configured to allocate service requests to either load balancer 124 or load balancer 606. In some embodiments, a DNS server with health checking and traffic steering capabilities may be utilized to service requests to either load balancer 124 or load balancer 606. Furthermore, in some embodiments, the third network device may be implemented at any time, including prior to the implementation of the first and/or second network devices.

In element 1014, a second service request is received from the client. For example, service request 602 may be received by load balancer 604 from client 130. In element 1016, the second service request is provided to each of the instances in the second group of instances. For example, the service request 602 may be routed through load balancer 606 to each of instances 626A-N+1. Because the second load balancer and second group of instances (i.e., load balancer 606 and instances 626A-N+1) have been implemented and are running, in some embodiments, the service request 602 is not routed to load balancer 124, nor is it routed to instances 126A-N. In element 1018, a determination is made as to whether all the service requests to the first group of instances have been completed. For example, once all of the service requests, such as service request 202, have been serviced by instances 126A-N and service request responses routed to client 130, all of the service requests for the first group of instances may be deemed complete.

If, in element 1018, a determination is made that all of the service requests to the first group of instances have not been completed, the method continues in block 1020 with completing the remaining service requests in the first group of instances. For example, instances 126A-N may process the remaining service requests and route service request responses to load balancer 124. Load balancer 124 then may route, in response to a majority of the service request responses being identical, one copy of the identical service request responses to the client 130. However, if, in element 1018, a determination is made that all of the service requests to the first group of instances have been completed, the method continues in block 1022 with terminating the first network device and each of the instances in the first group of instances. For example, once the last operation is completed within the environment consisting of load balancer 124 and instances 126A-N, load balancer 604 may terminate load balancer 124 and instances 126A-N, and no new service requests and/or transactions are routed to load balancer 124 and/or instances 126A-N. Instead, all service requests and/or transactions are routed to load balancer 606.

Figure 11:
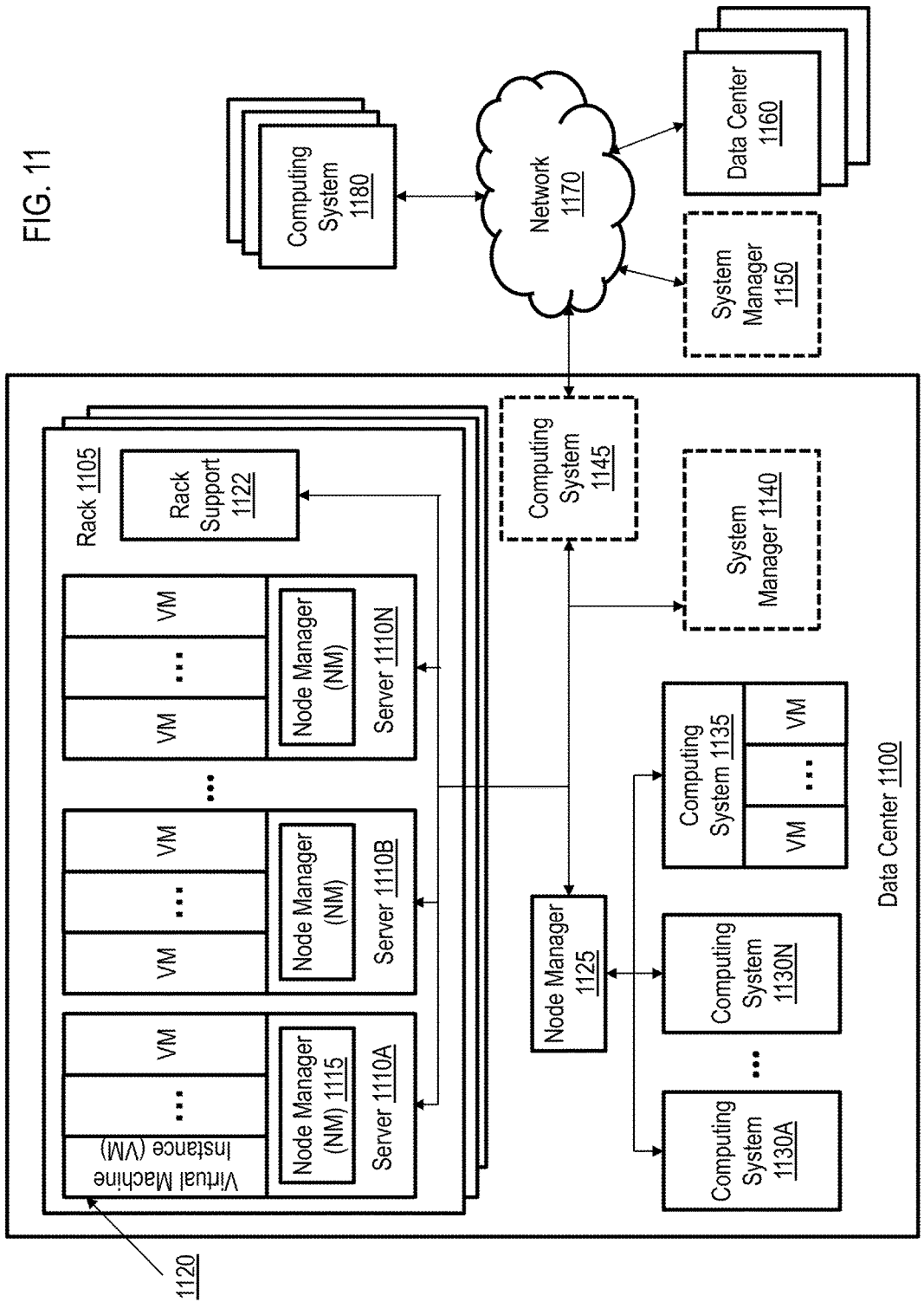
FIG. 11 shows a block diagram of a distributed computing environment, in accordance with various embodiments.

In at least some embodiments, a portion or all of one or more of the technologies described herein, including the techniques to implement the management service, web services platform, and/or virtual machine instances, may be implemented in a distributed computing environment, such as shown in FIG. 11. In particular, in this example, a program execution service manages the execution of programs on various computing systems located within a data center 1100. Data center 1100 includes a number of racks 1105, and each rack includes a number of computing systems 1110A-N, as well as a rack support computing system 1122 in this example embodiment. The computing systems 1110 each host one or more virtual machine instances 1120 in this example, as well as a distinct node manager 1115 to manage the virtual machines. In this example, each virtual machine 1120 may be employed to provide an independent computing environment for executing an instance of program. In this example, the rack support computing system 1122 may provide various utility services for other computing systems local to the rack, as well as possibly to other computing systems located in the data center 1100. The utility services may include, for example, data and/or program storage for other computing systems, execution of one or more machine manager modules to support other computing systems, etc. Each computing system 1110 may alternatively have a distinct machine manager module (e.g., provided as part of the node manager for the computing system) and/or have local storage (not shown) to store local copies of programs. The computing systems 1110 and the rack support computing system 1122 all share a common data exchange medium in this example, and may all be part of a single group. This common data exchange medium may be connected to one or more external data exchange mediums shared by, for example, other racks or computing systems in the data center 1100.

In addition, the example data center 1100 further includes additional computing systems 1130A-N and 1135 that share a common data exchange medium with a node manager 1125, and node manager 1125 manages computing systems 1130 and 1135. In the illustrated example, computing system 1135 also hosts a number of virtual machines as execution environments for use in executing program instances for one or more users, while computing systems 1130 do not host distinct virtual machines. In this example, an optional computing system 1145 resides at the interconnect between the data center 1100 and an external network 1170. The optional computing system 1145 may provide a number of services such as acting as a network proxy, managing incoming and/or outgoing data transmissions, etc. Additionally, an optional system manager computing system 1140 is also illustrated. The optional system manager computing system 1140 may assist in managing the execution of programs on other computing systems located within the data center 1100 (or optionally on computing systems located in one or more other data centers 1160). The optional system manager computing system 1140 may execute a system manager module. A system manager module may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc.

In this example, the data center 1100 is connected to a number of other systems via a network 1170 (e.g., the Internet), including additional computing systems 1180 that may be operated by the operator of the data center 1100 or third parties such as clients, additional data centers 1160 that also may be operated by the operator of the data center 1100 or third parties, and an optional system manager 1150. In a manner similar to system manager 1140, the system manager 1150 may manage the execution of programs on computing systems located in one or more data centers 1100 and/or 1160, in addition to providing a variety of other services. Although the example system manager 1150 is depicted as external to any particular data center, in other embodiments it may be located within a data center, such as one of the data centers 1160.

In at least some embodiments, a server that implements a portion or all of one or more of the technologies described herein, including the techniques to implement the load balancers 142, 604, and 606, may include a general-purpose computer system that includes or is configured to access one or more computer-accessible media. FIG. 12 shows such a general-purpose computing device 1200. In the illustrated embodiment, computing device 1200 includes one or more processors 1210 coupled to a system memory 1220 via an input/output (I/O) interface 1230. Computing device 1200 further includes a network interface 1240 coupled to I/O interface 1230.

In various embodiments, computing device 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA. In some implementations, graphics processing units (GPUs) may be used instead of, or in addition to, conventional processors. In some embodiments, management service 102, load balancers 124, 603, 606, and/or instances 126A-N of application 126 are implemented by processors 1210.

System memory 1220 may be configured to store instructions and data accessible by processor(s) 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1220 as code 1225 and data 1226

In one embodiment, I/O interface 1230 may be configured to coordinate I/O traffic between processor 1210, system memory 1220, and any peripheral devices in the device, including network interface 1240 or other peripheral interfaces such as various types of persistent and/or volatile storage devices used to store physical replicas of data object partitions. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computing device 1200 and other devices 1260 attached to a network or networks 1250, such as other computer systems or devices as illustrated in FIG. 1 through FIG. 11, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks such as Fibre Channel SANs, or via any other suitable type of network and/or protocol.

In some embodiments, system memory 1220 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1200 via I/O interface 1230. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Certain terms are used throughout the preceding description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of servicing a request in a distributed computing environment, comprising:
   configuring a plurality of computing devices to implement a plurality of compute instances of a provider network;
   allocating one or more of the computing devices to implement a network device that receives network traffic directed to an application;
   allocating each of the plurality of compute instances to execute the application;
   receiving, by the network device, a service request from a client directed to the application;
   providing, by the network device, the service request to each of the plurality of compute instances;
   receiving, by the network device, a service request response from each of the plurality of compute instances;
   in response to a majority of the service request responses being identical, providing, by the network device, one of the identical service request responses to the client; and
   in response to a first service request response being different from a majority of the service request responses, generating an alarm identifying a first of the plurality of compute instances from which the first service request response was received and terminating the first compute instance.

2. A system for servicing a request in a distributed computing environment, comprising:
   a plurality of computing devices, each computing device including a processor and memory, the plurality of computing devices configurable to implement a first compute instance group, the first compute instance group comprising a first plurality of compute instances of a provider network; and one or more of the computing devices configured to implement a first network device configured to:
receive a first service request from a client directed to an application, the application being run on each of the first plurality of compute instances;
provide the first service request to each of the first plurality of compute instances; receive a service request response from each of the first plurality of compute instances; and
terminate a compute instance of the first plurality of compute instances whose service request response is different from the service request responses of a majority of the plurality of compute instances.

3. The system of claim 2, wherein the first network device is further configured to:
receive the service request response from each of the first plurality of compute instances; store each of the service request responses in memory;
compare the service request responses,
in response to a majority of the service request responses having a same body, provide one of the majority of service request responses to the client.

4. The system of claim 2, wherein the first network device is configured to compare the service request responses by performing a digest operation on each of the service request responses.

5. The system of claim 3, wherein the first network device is further configured to:
responsive to the compute instance whose service request response is different from the service request responses of a majority of the first plurality of compute instances, generate an alarm.

6. The system of claim 2, wherein the one or more of the computing devices is further configured to implement a second network device, the second network device configured to:
receive a request to launch an additional compute instance in the first compute instance group;
implement a second compute instance group, the second compute instance group comprising a second plurality of compute instances, each of the second plurality of compute instances configured to run the application; and
implement a third network device configured to:
receive a second service request from the client directed to the application;
and provide the second service request to each of the second plurality of compute instances.

7. The system of claim 6, wherein the second compute instance group comprises a number of compute instances that is more than a number of compute instances in the first compute instance group.

8. The system of claim 6, wherein the second network device is further configured to, in response to the first network device providing a response indicative of a majority of service request responses to the client, terminate the first network device and each of the first plurality of compute instances.

9. The system of claim 2, wherein the first network device is a load balancer.

10. A computing system, comprising:
one or more processors; and
memory including instructions, that upon being executed by the one or more processors, cause the one or more processors to:
implement a first plurality of compute instances;
implement a first network device that receives network traffic directed to an application running on each of the first plurality of compute instances;
receive a first service request from a client directed to the application;
provide the first service request to each of the first plurality of compute instances; receive a service request response from each of the first plurality of compute instances; and
terminate a compute instance of the first plurality of compute instances whose service request response is different from the service request responses of a majority of the plurality of compute instances.

11. The system of claim 10, wherein the instructions, upon being executed, further cause the one or more processors to:
receive a service request response from each of the first plurality of compute instances; correlate each of the service request responses with one of the first plurality of compute instances;
compare each of the service request responses with each other;
in response to a majority of the service request responses being identical, provide one of the identical service request responses to the client.

12. The system of claim 11, wherein the instructions, upon being executed, further cause the one or more processors to:
responsive to the compute instance whose service request response is different from the service request responses of a majority of the first plurality of compute instances, generate an alarm.

13. The system of claim 12, wherein the instructions, upon being executed, further cause the one or more processors to, in response to the first of the first plurality of compute instances being terminated:
implement a second plurality of compute instances configured to each run the application; implement a second network device that receives network traffic directed to the application
running on each of the second plurality of compute instances;
receive a second service request from the client directed to the application; and
provide the second service request to each of the second plurality of compute instances.

14. The system of claim 13, wherein the instructions, upon being executed, further cause the one or more processors to, in response to the first service request response providing the one of the identical service request responses to the client, terminate the first network device and each of the first plurality of compute instances.

15. The system of claim 10, wherein the first network device is a load balancer.

* * * * *